United States Patent [19]

Hall et al.

[11] 4,242,379

[45] Dec. 30, 1980

[54] ACID INHIBITOR TREATMENT OF SUBSTRATE PRIOR TO AUTODEPOSITION

[75] Inventors: Wilbur S. Hall, Plymouth Meeting; Harry M. Leister, Ambler, both of Pa.

[73] Assignee: Amchem Products, Inc., Ambler, Pa.

[21] Appl. No.: 55,974

[22] Filed: Jul. 10, 1979

Related U.S. Application Data

[63] Continuation of Ser. No. 917,634, Jun. 21, 1978, abandoned, which is a continuation-in-part of Ser. No. 755,919, Dec. 30, 1976, abandoned.

[51] Int. Cl.$^3$ .............................................. A23F 3/34
[52] U.S. Cl. .................................... 427/327; 427/435; 134/2
[58] Field of Search .................... 148/6.2, 6.15 R; 427/435, 327; 134/2; 252/156, 135

[56] References Cited

U.S. PATENT DOCUMENTS

| | | | |
|---|---|---|---|
| 1,279,101 | 9/1918 | Gravell | 148/6.15 R |
| 2,304,299 | 12/1942 | Boyle et al. | 148/6.15 Z |
| 3,585,084 | 6/1971 | Steinbrecher et al. | 427/435 |
| 3,900,601 | 8/1975 | Franz et al. | 148/6.2 |
| 3,973,998 | 8/1976 | Datta et al. | 427/309 X |

FOREIGN PATENT DOCUMENTS 741124  2/1974  South Africa ..................... 427/435

OTHER PUBLICATIONS

Kirk-Othmer, Encycl. of Chem. Tech., 2nd Ed., vol. 6, pp. 324, 343, vol. 13, pp. 286, 287 (1965).

*Primary Examiner*—Ronald H. Smith
*Assistant Examiner*—Richard Bueker
*Attorney, Agent, or Firm*—Alexis Barron

[57] ABSTRACT

A metallic substrate is pretreated with a composition containing an acid corrosion inhibitor prior to subjecting the substrate to an acidic aqueous autodepositing coating composition of the type which contains dissolved fluoride and ferric ions in order to improve the quality of the coating formed from said autodepositing composition by reducing or preventing the tendency of the composition to form coatings which contain pinholes or blisters on worked or roughened areas of the metallic surface.

10 Claims, No Drawings

ACID INHIBITOR TREATMENT OF SUBSTRATE PRIOR TO AUTODEPOSITION

This application is a continuation of Ser. No. 917,634, filed June 30, 1978, now abandoned, which was a C.I.P. of Ser. No. 755,919, filed Dec. 30, 1976, now abandoned.

This invention relates to an improvement in the formation of autodeposited organic coatings on metallic surfaces. More specifically, this invention relates to the preparation of metallic surfaces for depositing organic coatings thereon by contacting the metallic surfaces with an acidic aqueous coating solution containing dispersed particles of an organic coating-forming material such as resin particles which deposit on the metal surface to form a coating which increases in thickness the longer the surface remains in contact with the solution.

A relatively recent development in the coating field is the provision of water-based coating compositions which are effective, without the aid of electricity, in forming on metallic surfaces immersed therein organic coatings that increase in thickness or weight the longer the time the surfaces are immersed in the compositions. (For convenience, a coating composition of this type is hereafter referred to as an "autodepositing composition" and a coating formed from such a composition is hereafter referred to as an "autodeposited coating".) Speaking generally, compositions which are so effective comprise acidic aqueous coating solutions having dispersed therein particles of an organic material such as resin particles. Autodeposited coatings are formed from such compositions as a result of their ability to attack the metallic surface and generate ferric ions in amounts which cause the particles to deposit on the surface in a manner such that there is a continuous buildup of organic coating on the surface which coating has a substantially higher solids concentration than that of the solution from which it forms.

Coatings formed from such compositions are distinctly different from coatings formed by immersing the metallic surfaces in conventional latices, that is, compositions comprising solid resin particles dispersed in water. The weight or thickness of a coating formed by immersing a metallic surface in a conventional latex is not influenced by the time the surface is immersed in the latex. It is in the main influenced by the amount of resin solids dispersed in the aqueous medium.

Coatings formed from autodepositing compositions are also distinctly different from coatings formed from earlier known acidic aqueous coating solutions containing dispersed solid resin particles and relatively high amounts of water soluble corrosion inhibitors, such as compounds containing hexavalent chromium. The use of relatively high amounts of corrosion inhibitors in such solutions deters attack of the metallic surface to an extent such that resinous coatings which grow with time are not obtained. Thus, resinous coatings formed by immersing metallic surfaces in such compositions are like those formed from immersing the metallic surfaces in conventional latices in that they do not grow with time.

The use of autodepositing compositions offers a number of advantages. For example, autodepositing compositions containing relatively small amounts of coating-forming solids can be used to apply relatively thick organic coatings to metallic surfaces in a relatively short period of time and in a one-step operation. Also, the coating thickness can be controlled by varying the immersion time of the metallic surface in the autodepositing composition. In addition, edges of the metallic substrate can be coated readily. In general, coatings which have good corrosion resistant properties and aesthetic appearance are obtainable. And such coatings can be formed without using externally applied electricity, as is required in electrocoating. These are but a few of the advantages which flow from the use of autodeposition, that is, the coating process which involves the formation of autodeposited coatings without the use of electricity.

Although autodepositing compositions are capable of forming organic coatings of excellent quality, it has been observed that under certain conditions, coatings having defects are formed. Examples of such defects are pinholes, blisters, and/or craters.

For use in some applications, such defects may be of little or no consequence. However, there are applications where coatings containing such defects would be intolerable or at least undesirable. Such defects generally lower the corrosion resistant properties of the coatings. In applications where such properties are important, such coatings would be unsuitable. They would be unsuitable also in applications in which it is desired that the coating appearance comprises a smooth unbroken film.

The present invention relates to reducing or preventing the formation of defects in coatings formed from an autodepositing composition.

SUMMARY OF THE INVENTION

In accordance with this invention, a metallic substrate capable of receiving an autodeposited coating is pretreated with an aqueous solution of a composition which inhibits acid corrosion prior to subjecting the metallic substrate to an autodepositing composition. Pretreating the substrate in accordance with this invention in applications in which an autodepositing composition tends to form coatings have defects such as blisters, craters, and/or pinholes has been found to be effective in deterring or preventing the formation of such defects.

Pretreatment of the substrate in accordance with the present invention can be accomplished conveniently by subjecting the substrate to an aqueous solution of the acid inhibitor and preferably by combining the acid inhibitor treatment with the alkaline cleaning step in an autodepositing coating process.

As will be seen from the detailed description which follows, many different types of acid inhibitors can be used in the practice of the present invention. Mixtures containing two or more acid inhibitors can be used also.

Some examples of acid inhibitors, which are also known in the metal treating art as "corrosion inhibitors," are: aldehydes, ketones, amines, thiols, mercaptans, sulfides, thioureas, organic phosphates, oximes, chromates, dichromates, and alkynols. For convenience, acid inhibitors are also referred to herein simply as "inhibitors".

DETAILED DESCRIPTION OF THE INVENTION

As will be seen from examples reported below, there are autodepositing applications in which defectfree coatings are produced. However, under certain conditions, autodeposited coatings having defects are formed.

One of the factors involved in the formation of coatings having defects is the type of metal surface being treated. Coating defects have been encountered when coating metal surfaces which have been worked, for example, subjected to forming, stamping, bending, drawing, shearing, sanding, abrading or similar operations. Working of the metal surface generally imparts strains or stresses to the metal and can result in scratching, scoring or galling of the surface. The more highly worked the surface, the greater the tendency for coatings formed thereon to contain defects. In general, the defects are confined to those portions of the coating that overlie the portions of the metal surface that have been worked. For example, in an application in which but a portion of the metal surface has been galled as a result of a stamping operation, defects have been observed in only those portions of the coating that overlie the gall marks; otherwise, the coating is defect-free.

Defects in autodeposited coatings have also been encountered when coating metal surfaces that are in a roughened condition for reasons other than their having been worked. Articles made by a casting operation often have roughened surfaces as a result of the rough surfaces of the walls of the mold in which the article is formed.

Defects in autodeposited coatings formed on metal surfaces of the type described above can take various forms, depending on the particular application involved. For example, the defects may show up as pinholes, blisters and/or craters in the coating. (The term "crater", as used herein, refers to a defect having the appearance of a small bowl-shaped depression in the organic coating.) In some applications, defects are not observable in the wet unfused coating, but they appear after the coating has been fused by subjecting it to an elevated temperature. In other applications, the wet coating may contain blisters which are converted to pinholes during fusion of the coating at elevated temperatures, or the blisters may remain in the coating after fusion. Still in other applications, pinholes have been observed in the wet, unfused, coating.

Process steps used in an autodepositing operation often include subjecting the wet autodeposited coating to rinse steps after the metal article has been contacted with the autodepositing composition. For example, a wet or partially dried coating can be subjected to a water rinse and/or contact with an aqueous chromium-containing solution for the purpose of improving the corrosion resistant properties of the coating. In some applications, the problem is so severe that those portions of the coating overlying the portions of the surface that lead to the aforementioned type defects slough upon contact with the liquid composition, that is, pieces of the coating are removed during the rinse treatment. In such cases, the defect appears as an uncoated portion of the metal surface.

There are a number of additional factors which play a role in whether or not defects in autodeposited coatings are encountered, and if they are encountered, the extent or degree of their severity. As will be seen from examples reported below, there are applications in which defects are encountered utilizing a particular type of autodepositing composition, but they are not encountered when utilizing a different type of autodepositing composition. The temperature of the autodepositing composition can also play a role in that, in general, the higher the temperature of the composition, the greater the tendency for defects to be formed. The thickness of the coating can also have an effect in that the greater the thickness, the less likelihood of defect formation. Coating thickness in turn can depend on various factors, such as, for example, the time of contact of the metal surface with the autodepositing composition, the coating-forming solids content of the autodepositing composition, and the temperature of the autodepositing composition.

In any particular application which involves coating of metal surfaces of the type described above, and in which coating defects of the type referred to above are encountered, inhibitor pretreatment of the surface according to the present invention can be used to deter or prevent the formation of such defects. Acid inhibitors (corrosion inhibitors) are a known class of materials which are used to deter attack or corrosion of metallic surfaces which are exposed to a corrosive environment such as an acid solution. Such materials are used widely in acid pickling solutions to deter removal of the base metal from which oxide scale or other unwanted deposits are removed by acid attack thereof. They are used widely also in acidic compositions which are pumped through metal tubing in the acidizing of oil wells. And they are used also to a great extent in preventing boiler corrosion.

The number of acid inhibitors reported in the literature is legion. Generally speaking, the inhibitors which are suitable for improving the quality of auto-deposited coatings are those which reduce acid attack of a metallic surface contacted therewith by adsorption to the anodic sites on the metal surface. Such inhibitors are usually referred to as anodic inhibitors. Mixtures of acid inhibitors can be used also. Suitable inhibitors include organic compounds, as well as inorganic compounds. By way of example and generally speaking, acid inhibitors which can be used in the pretreatment process of this invention are the acid corrosion inhibitors of the anodic type including aldehydes, ketones, amines, thiols, mercaptans, sulfides, thioureas, organic phosphates, oximes, chromates, dichromates and alkynols, for examples, propargyl alcohol. The preferred inhibitors are the inorganic salts, preferably the chromates or dichromates which are conveniently added to the alkaline cleaner as dichromate salts particularly the ammonium, potassium or sodium salts with sodium dichromate being especially preferred.

Among the organic acid inhibitors that can be used are amine compounds which are the product of a Mannich reaction which involves the reaction of a nitrogen compound having at least one active hydrogen attached to a nitrogen atom with an alpha-ketone and formaldehyde in the presence of an acid. The use of rosin amines in a Mannich reaction, as described in U.S. Pat. No. 2,758,970, is exemplary, although other types of primary or secondary amines can be used.

An example of an acid inhibitor composition is one prepared from thiourea and the product of a Mannich reaction involving the following reactants: amines derived from pine resin acids (predominately dehydroabietylamine), acetophenone, acetone and formaldehyde and reacted in the presence of hydroxyacetic acid. The composition contains about 0.004 to about 1100 parts by weight, preferably about 0.09 to about 150 parts by weight of the product of the Mannich reaction for each part of thiourea. In general, such an acid inhibitor composition will also contain surfactants which help to stabilize and disperse the Mannich reaction product in the acidic composition and alcohols which are generally added as solubilizers to the aqueous concentrate of the inhibitor composition.

The entirety of the metal surface or only those portions of the surface which give rise to the defect problem can be contacted with the inhibitor pretreating material. Although contact of the metal surface with the inhibitor material can be accomplished in various ways, it has been found convenient to contact the surface with an aqueous solution of the inhibitor.

There are numerous factors involved in determining the effective inhibitor concentration of the pretreating solution. Among such factors are the strength of the particular acid inhibitor used, the temperature of the pretreating solution, the time of contact between the solution and the metal surface, and the type of metal surface being treated. In view of the numerous variables that are involved, it is suggested that experience in a particular application be used to determine optimum inhibitor concentration and treating conditions. In general, the higher the inhibitor concentration of the solution, the lower the temperatures of application and the shorter the contact times that can be used. Similarly, less concentrated inhibitor solutions can be used with higher temperatures of application and longer contact times.

The inhibitor is used in an amount sufficient to passivate the anodic sites in the worked or roughened surface areas and, in general, will prevent pinholing when the inhibitor concentration is sufficient to allow for adsorption of inhibitor on at least the relatively active anodic sites. Preferably, the inhibitor is added to the cleaning solution in an amount sufficient to provide an inhibitor concentration of about 0.3 to about 5 wt.% in solution. The preferred temperature for the pretreatment of the solution is within the range of about 65° F. to about 200° F. and the contact time between the solution and the metal surface is from about 30 seconds to about 5 minutes. In the preferred method the temperature and time of treatment will, in general, be determined by the time and temperature required for the cleansing stage with the inhibitor treatment accomplished by simply adding the appropriate amount of inhibitor to the alkaline cleaning solution. Amounts of inhibitor which affect the metal surface in a manner such that autodeposition is adversely affected should be avoided. It is recommended that the pretreating solution contain no more than about 5 wt.% of inhibitor, preferably no more than about 1 wt.%.

It is believed that for most applications, operating within the above parameters will be effective in deterring or preventing the development of coating defects. However, it should be understood that because of the numerous variables involved, as mentioned above, effective results may be achieved by using lower or higher inhibitor concentrations and/or shorter or longer contact times.

As noted above, the inhibitor pretreatment is best carried out by combining the inhibitor with a cleaning material. Utilizing such a solution, the metal surface can be cleaned (if this is necessary) at the same time that it is treated with the inhibitor. The preferred cleaning composition for autodepositing processes are the alkaline cleaning materials particularly the caustic cleaning solutions such as a solution of sodium hydroxide and sodium tripolyphosphate.

Pretreating the metal surface can also be effective in reducing the tendency of coatings to bridge. Bridging occurs in coatings formed on articles having surfaces which do not lie in the same plane, but which intersect, and appears at the line of intersection. Bridging is evidenced by the pulling away of the coating from the underlying metallic surface at the aforementioned line of intersection.

Coating compositions which are effective in forming autodeposited coatings are known. Examples of such coating compositions are described in U.S. Pat. Nos. 3,585,084, 3,592,699, 3,709,743 and 3,776,848, in British Pat. No. 1,241,991, in South African Pat. No. 72/1146 and in Belgian Patent of Addition No. 811,841.

Speaking generally, the acidic aqueous coating compositions of the aforementioned type function to attack and dissolve from a metallic surface contacted therewith metal ions in an amount sufficient to directly or indirectly cause organic particles in the region of the metallic surface to deposit thereon in a continuous fashion, that is, in a manner such that there is a buildup in the amount of organic material deposited on the surface the longer the time the surface is in contact with the composition. This deposition of the organic material on the metallic surface is achieved through chemical action of the coating composition on the metallic surface. The use of electricity which is necessary for the operation of some coating methods, such as the electrocoating method, is not required.

It is believed that the present invention will be used most widely in connection with coatings formed from autodepositing compositions that contain solid particles of resin dispersed in an aqueous solution containing dissolved fluoride and ferric iron. (For example, see South African Pat. No. 72/1146.) Preferably, the aqueous phase of the coating composition contains surfactant in an amount below the critical micelle concentration (hereafter referred to as "CMC"), and most preferably, the concentration of surfactant in the aqueous phase of the composition is below the surfactant concentration which corresponds to the inflection point on a graph of surface tension versus the logarithm of surfactant concentration in the composition. Preferably, the composition includes an anionic surfactant and the source of the resin dispersion of the composition is a latex containing surfactant in an amount such that the aqueous phase of an autodepositing composition formulated from the latex has a surfactant concentration below the CMC, preferably below the aforementioned inflection point surfactant concentration.

A preferred composition for use in the practice of the present invention is described in U.S. Patent application Ser. No. 664,613, now abandoned, filed Mar. 8, 1976, in the name of Wilbur S. Hall, and assigned to the same assignee as the present invention, and incorporated by reference. The preferred composition has a surfactant concentration as described above and a pH of about 1.6 to about 4 and is prepared from water, a ferric-containing compound, most preferably ferric fluoride, in an amount such that it contains the equivalent of about 0.5 to about 3.5 g/l of ferric iron, about 0.2 to about 5 g/l of HF, optionally a pigment such as carbon black, and about 50 to about 125 g/l of resin particles which are all of substantially the same size and substantially chemically homogeneous, that is, each particle is comprised of the same monomeric constituents present in substantially the same proportions or resin particles which are prepared by copolymerizing the following monomers:

(1) about 25 to about 70, and preferably about 40 to about 65 wt.% of conjugated diene having, for example, 4 to about 9 carbon atoms, such as butadiene or isoprene;

(2) about 5 to about 70, and preferably about 30 to about 65 wt.% of $CH_2=CHR$, wherein R is an aryl or a cyano group, for example, styrene or acrylonitrile;

(3) about 1 to about 50, and preferably about 3 to about 15 wt.% of a vinyl halide such as vinyl chloride or vinylidene chloride; and (4) about 0.5 to about 15, and preferably about 1 to about 4 wt.% of a monoethylenically unsaturated monomer having a functional group selected from the class consisting of amide and carboxylic groups, such as acrylamide, methacrylamide, octyl acid maleate and monoethylenically unsaturated monocarboxylic and dicarboxylic acids having about 3 to about 12 carbon atoms, such as, for example: acrylic acid; cinnamic acid; methacrylic acid; crotonic acid; itaconic acid; maleic acid; and fumaric acid.

The resin is used most conveniently in the form of a latex which can be prepared according to available techniques.

A particularly preferred latex contains particles of resin prepared from the aforementioned monomers, which particles are chemically and physically homogeneous. The resin particles of the preferred latex are prepared from styrene, butadiene, vinylidene chloride and methacrylic acid. In addition, the emulsifier or surfactant content of the preferred latex is about 1 to about 4% based on the resin solids and comprises at least 90 wt.%, most preferably 100 wt.% of an anionic emulsifier such as a sulfonate, for example, sodium dodecylbenzene sulfonate, or a sulfosuccinate, for example, sodium oleoyl isopropanolamide sulfosuccinate, or a mixture thereof.

A highly preferred autodepositing composition has a surfactant concentration as described above and a pH within the range of about 2 to about 3.2 and comprises about 50 to about 125 g/l of resin solids, ferric fluoride, in an amount equivalent to about 0.5 to about 2 g/l of ferric iron, and about 0.7 to about 3 g/l of HF.

As to the cause of coating defects in autodeposited coatings, it is believed that those portions of a metal surface which have been worked are more sensitive to the coating composition than portions which have not been worked. In other words, it is believed that the worked portions of the surface are more highly reactive and are more readily attacked by the coating composition with the result that, at these portions, hydrogen ion is reduced to hydrogen in amounts greater than that generated at other less reactive portions of the surface. It is believed that excessive amounts of hydrogen are also produced when coating roughened surfaces of the type mentioned above and also when coating surfaces of the type that lead to bridging defects.

In severe applications involving the coating of worked or roughened surfaces where relatively high amounts of hydrogen are generated, defects such as pinholes are evident in the wet or uncured coating. In less severe applications, it appears that the hydrogen remains entrapped beneath or within the coating until the coating is cured or fused at elevated temperature at which time the hydrogen expands. Depending on various factors, the hydrogen may cause pinholes, blisters, or craters to be formed in the coating.

It is believed that acid inhibitor pretreatment of the surface passivates the relatively reactive portions of the surface, thus, deterring or preventing the generation of excessive hydrogen, which in turn leads to the formation of improved quality coatings.

The defects in autodeposited coatings in worked or roughened surfaces are believed to be caused by an increased intensity of attack on these areas of the metal surface by the acidic aqueous autodepositing composition. Such increased intensity of attack appears to occur at restricted anodic areas which develop in the worked or roughened portion of the metal surface. By passivating such restricted anodic areas the intensity of the coating reaction can be slowed thereby eliminating the tendency to form hydrogen gas and consequent pinholing. Passivation can be accomplished by treatment with any of the anodic inhibitors preferably the inorganic inhibitors such as chromates. Preferred treatments will limit or decrease the intensity of attack in the small localized anodic areas which are believed to be the cause of the coating defects without significantly inhibiting the overall acid corrosion susceptibility so that the autodepositing process itself is not substantially altered. The anodic inhibitors are believed to function by adsorbing to the anodic areas thereby reducing the otherwise intensified attack of the coating composition at these sites. Accordingly, the preferred inhibitors for use in the process improvement of this invention are those which are readily adsorbed onto the anodic sites to limit attack at these sites with minimum effect on the overall corrosion rate which is necessary for the autodepositing process. The preferred inhibitors are the chromates especially aqueous solutions of sodium dichromate, potassium dicromate or ammonium dicromate, and the preferred treatment comprises combining the inhibitor treatment with the alkaline cleaning process particularly those using sodium hydroxide cleaning compositions.

It is apparent that when the anodic inhibitor treatment of this invention is combined with the cleaning step the resulting metal is expected to be free of any detectable surface coating. While it is believed that the inhibitor functions by adsorption to the anodic sites it is nonetheless preferred that the metal surface be free of a coating since the autodepositing process works best on a clean coating-free metal surface.

As mentioned above, one of the factors involved in the development of coating defects is the temperature at which the autodepositing composition is contacted with the metal surface. In this connection, it is noted that autodepositing compositions are effective in forming coatings on metal surfaces over a wide temperature range, including temperatures approaching the boiling point of the composition and temperatures approaching those at which the dispersed organic coating-forming particles are undesirably coagulated. There are advantages in operating at elevated temperatures. Speaking generally, the higher the temperature of the composition, the greater the rate of coating formation. Thus, at higher temperatures the shorter the time required to produce coatings of a given thickness. On the other hand, the use of higher temperatures usually leads to a more aggravated condition of coating defects when coating metal surfaces of the type that are prone to this problem. One of the advantages of the present invention is that the coating composition can be used effectively at a temperature that might otherwise be avoided because the use of such temperature, in the absence of acid inhibitor pretreatment, would normally lead to the formation of coating defects.

In copending application Ser. No. 608,967 filed Aug. 29, 1975, now abandoned there is disclosed a method for preventing surface defects in autodeposited coatings by the careful control of the temperature of the coating bath. The present process can be used as an alternative to such temperature control or in conjunction with temperature control. In those instances where it is desired to operate at elevated temperatures, e.g. above 80° F., the present process is especially useful.

Although the coating composition can be contacted with the metal surface in a variety of ways, including, for example, by spraying and flow coating, it is believed that the most widely used method of contact will comprise immersing the metal surface in the coating composition at about room temperature. As mentioned above, the longer the metal surface is contacted by the coating composition, the greater the build-up in coating thickness. It is believed that for most applications, desired coating thicknesses can be obtained by immersing the metal surface in the composition for a period of time within the range of about 30 seconds to about 3 minutes. However, it should be understood that longer or shorter periods of time can be used.

Agitating the composition aids in maintaining it uniform. Also, agitation of the composition is effective in improving the uniformity of the coatings formed.

Various factors should be taken into account in determining whether the metal surface should or should not be cleaned, and the extent of cleaning, prior to contact with the autodepositing composition, including, for example, the nature of foreign materials (if any) on the surface and the desired quality of the coating. Foreign materials which are present on the metal surface can lead to the formation of coatings which are not uniform. Also, the adhesion and corrosion resistant properties of the resinous coatings can be affected adversely as a result of the presence on the metal surface of foreign materials during the coating step. Generally speaking, improved quality coatings can be consistently obtained when the metal surface is clean and free of foreign materials Excellent results can be achieved consistently by subjecting the metal surface to a cleaning operation which results in a surface on which there can be formed a waterbreak-free film.

The selection of the cleaning agent and mode of application thereof to the metal surface will depend on the type of foreign materials present on the metal surface. Available cleaning agents can be used in accordance with known technology. Thus, depending on the type of soil or foreign materials which are present, acidic, alkaline or other cleaning agents can be used. By way of example, hot alkaline compsitions can be used for the removal of oils, greases, fingerprints and other organic deposits. The process improvement of this invention is generally applicable in those instances where the metal surfaces to be coated have been subjected to a stamping or similar forming operation after which the formed piece is subjected to alkaline cleaning prior to coating by immersion in an autodepositing composition.

After contact with the autodepositing composition, the coated metal surface can be subjected to further processing steps as are known. Such steps are described briefly hereafter.

Water rinsing the coated surface after it has been withdrawn from the composition, and before significant drying takes place is effective in removing therefrom residuals such as acid and other ingredients of the bath that adhere to the coated surface. If such residuals are allowed to remain on the coated surface, they may change or adversely affect the quality of the coating. For a specific application, a determination can be made as to whether the residuals cause adverse effects which are not tolerable. If they do, they should be removed, for example, by water rinsing with tap or deionized water. If they do not, this step of removing them can be avoided.

If desired, the corrosion resistant properties of the coated surface can be improved by contacting the coated surface with an acidic aqueous rinse solution containing hexavalent chromium. Such rinse solutions can be prepared from chromium trioxide or a water soluble dichromate or chromate salt, for example, ammonium, sodium and potassium salts. There can also be used a chromium composition obtained by treating a concentrated aqueous solution of chromic acid with formaldehyde to reduce a portion of the hexavalent chromium. This type of rinse composition, which is described in U.S. Pat. No. 3,063,877 to Schiffman, contains chromium in its hexavalent state and reduced chromium in aqueous solution. It has been reported also that the water and salt spray resistance of a fused resinous coating can be improved by contacting the unfused coating with a solution, preferably an aqueous solution, of phosphoric acid (see U.S. Pat. No. 3,647,567). The recommended amount of phosphoric acid in the solution is about 0.25 to about 7 wt. % based on the total weight of the solution.

Following any rinse steps employed after the coated surface is withdrawn from the composition, the coating should be dried. Fusion of the resinous coating renders it continuous, thereby improving its resistance to corrosion and adherence to the underlying metal surface.

The conditions under which the drying and/or fusion operation is carried out depend somewhat upon the type of resin employed. In general, heat will be required to fuse the resin. The corrosion resistant properties of coatings fused at elevated temperature have been observed to be better than coatings which have been air dried. However, there are applications where air dried coatings can be used satisfactorily. The fusion of the coating should be carried out below temperatures which cause the resinous coating to degrade. Exemplary conditions used in fusing coatings produced according to the present invention are temperatures within the range of about 100 to about 200° C. for periods of time within the range of about 10 to about 30 minutes, depending on the mass of the coated part. Baking the coating for a period of time until the metal surface has reached the temperature of the heated environment has been used effectively.

EXAMPLES

Unless stated otherwise, the following autodepositing composition was used in the examples reported below.

| latex containing about 54% solids | 140 g |
|---|---|
| ferric fluoride | 3 g |
| hydrofluoric acid | 2.1 g |
| water | to make 1 liter |

The resin of the latex used in the above composition comprised about 62% styrene, about 30% butadiene, about 5% vinylider chloride and about 3% methacrylic acid. A film formed from the resin is soluble in refluxing chlorobenzene to the extent of about 13%. That the resin is cross-linked is indicated by its insolubility in Soxhlet extraction with chlorobenzene. The water soluble content of the latex is about 2% based on the weight of dried resin, with the water soluble content comprising about 10% sodium phosphate, about 13% sodium oleoyl isopropanolamide sulfosuccinate and about 75% sodium dodecylbenzene sulfonate, the first mentioned ingredient being a buffering agent used in preparing the latex, and the last two mentioned ingredients being emulsifiers. The pH of the latex was about 7.8 and the surface tension thereof about 45-50 dynes/cm. The average particle size of the resin was about 2,000 A.

The metal parts that were treated in the procedure described in the examples were sections of cold rolled steel mounting rings for automobile headlamps that were formed by a stamping operation. Each of the sections contained surface portions that were galled.

The pretreating solutions used in the first group of examples contained mercaptobenzothiazole (acid inhibitor) in the amounts indicated in Table 1 below and about 45 g/l of an alkaline cleaning material sold under the trademark Ridoline 1027 by Amchem Products, Inc. (The alkaline cleaning material comprised mainly sodium hydroxide and sodium tripolyphosphate.)

Sections of the mounting rings were immersed in the pretreating solutions identified in Table 1 below for 5 minutes at a temperature of 160° F. and thereafter were rinsed with tap water. The sections were then immersed in the autodepositing composition described above for 75 seconds. After withdrawal from the composition, the coated sections were allowed to partially dry in air for about 1 minute and then were rinsed by immersion in tap water. The coated parts were then baked in an oven having a temperature of 120° C. for 10 minutes. For comparative purposes, a section was pretreated with a pretreating solution that contained no acid inhibitor. Descriptions of the autodeposited coatings that were obtained are set forth in Table 1 below.

TABLE 1

| Ex. | Amount of Mercaptobenzothiazole in Pretreating Solutions | Description of Autodeposited Coatings |
| --- | --- | --- |
| 1 | none | many craters and many pinholes |
| 2 | 1 g/l | fewer craters and fewer pinholes |
| 3 | 3 g/l | few craters and few pinholes |
| 4 | 5 g/l | very few craters and very few pinholes |

From Table 1 above, it can be seen that as the concentration of the acid inhibitor was increased, improvements in the qualities of the coatings were realized. The pinholes and craters that were present in the coatings were present in those portions that overlay the portions of the sections that were galled.

EXAMPLE 5

The pretreating solution used in this example comprised an aqueous solution of alkaline cleaning materials and a mixture of inhibitors, namely sodium dichromate and sodium nitrite. The aqueous solution comprised:

| Ingredients | Amt., approximate wt. % |
| --- | --- |
| sodium dichromate | 0.7 |
| sodium nitrite | 0.01 |
| sodium hydroxide | 3.5 |
| phosphoric acid | 0.84 |
| chelating agent (Chelox 78) | 0.15 |

A section of the aforementioned mounting ring was immersed in the pretreating solution for 30 seconds at a temperature of 160° F. The pretreated section was then coated in the manner described above in connection with Examples 1 to 4. The autodeposited coating that was formed contained very few blisters and quite a few craters. This was an improvement over a section that was not so pretreated, but coated in the same way, which section had many pinholes in the coating overlying the gall marks of the section.

EXAMPLE 6

Another section of mounting ring was treated in the same manner as the section of Example 5 except that the pretreating solution contained 10 g/l of sodium nitrite and 45 g/l of the alkaline cleaning solution described in Examples 1 to 4. The autodeposited coating that was formed was similar in appearance to the coating of the pretreated section described in Example 5.

EXAMPLE 7

The pretreating solution used in this example contained 5 g/l of sodium dichromate dihydrate and 45 g/l of the alkaline cleaning material described in Examples 1 to 4. A section of mounting ring was immersed for 5 minutes in the pretreating solution at a temperature of 160° F. The pretreated part was then rinsed with water and immersed for 75 seconds in an autodepositing coating composition like that used in the previous examples, except that the amount of latex was about 185 g/l and the composition contained 5 g/l of a black pigment dispersion having a total solids content of about 36%. Carbon black comprised about 30% of the dispersion which had a pH of about 10-11.5 and a specific gravity of about 1.17. The aqueous dispersion contained a non-ionic dispersing agent for the solids, and is sold under the trademark Aquablak 115.

After withdrawing the coated section from the autodepositing composition, it was partially dried in air for about 1 minute, rinsed with water and baked for 10 minutes at a temperature of 220° F. The coating contained no blisters, craters or pinholes. Another section of mounting ring was treated in exactly the same way, except that the pretreatment solution contained no sodium dichromate. Its coating contained pinholes and blisters in the portions that overlay the gall marks of the section.

Whereas the improvement in autodeposition described herein relies upon treating the metal surface with an acid corrosion inhibitor prior to contacting the metal surface with an autodepositing composition, it has also been found that a similar improvement can be obtained by adding an acid corrosion inhibitor to the autodepositing composition. The latter method is the subject of co-pending application Ser. No. 755,921 filed Dec. 30, 1976 and assigned to the same assignee:

We claim:

1. In a coating process wherein an autodeposited coating is formed on a worked or roughened metal surface by contacting said surface with an autodepositing composition comprising an acidic aqueous solution containing dissolved fluoride and ferric ions and having resin solids dispersed therein and wherein the coatings formed from said composition tend to contain defects, the improvement comprising treating said metal surface with an anodic acid inhibitor in an amount sufficient to passivate the anodic sites in the worked or roughened areas of said metal surface, said inhibitor not forming a detectable coating on said surface, prior to contacting said surface with said acidic coating composition.

2. In a coating process wherein an autodeposited resinous coating is formed on a worked metal surface or an unworked roughened metal surface by immersing said surface in an autodepositing composition comprising an acidic aqueous solution containing dissolved fluoride and ferric iron and having dispersed therein resin solids and wherein said composition tends to form on said surface coatings having defects, including blisters, craters, pinholes or uncoated portions of the metal surface, the improvement comprising contacting said metal surface with an aqueous alkaline cleaning solution having an acid corrosion inhibitor dissolved therein in an amount sufficient to passivate the anodic sites in the worked or roughened areas of said metal surface, said inhibitor not forming a detectable coating on said surface, prior to immersing said surface in said coating composition.

3. In a coating process wherein an autodeposited resinous coating is formed on a worked metal surface or an unworked roughened metal surface by immersing said surface in an autodepositing composition comprising an acidic aqueous solution containing dissolved fluoride and ferric iron and having dispersed therein resin solids wherein said composition tends to form on said surface coatings having defects, including blisters, craters, pinholes or uncoated portions of the metal surface, the improvement comprising contacting said metal surface with an aqueous alkaline cleaning solution having dissolved therein about 0.3 to about 5 wt. % of an organic acid inhibitor, said inhibitor not forming a detectable coating on said surface, prior to immersing said surface in said composition.

4. The process of claim 3 wherein the aqueous alkaline cleaning solution comprises an aqueous solution of sodium hydroxide and sodium tripolyphosphate.

5. The process of claim 4 wherein the organic acid inhibitor is mercaptobenzothiazole.

6. The process of claim 4 wherein the organic acid inhibitor is the product of a Mannich reaction of an amine derived from pine resin acids, acetone and formaldehyde and reacted in the presence of hydroxyacetic acid.

7. In a coating process wherein an autodeposited resinous coating is formed on a worked metal surface or an unworked roughened metal surface by immersing said surface in an autodepositing composition comprising an acidic aqueous solution containing dissolved fluoride and ferric iron and having dispersed therein resin solids and wherein said composition tends to form on said surface coatings having defects, including blisters, craters, pinholes or uncoated portions of the metal surface, the improvement which comprises contacting said metal surface which is free of acid removable soils with an aqueous alkaline cleaning solution having dissolved therein about 0.3 to about 5 wt. % of an acid inhibitor selected from the group consisting of chromates and dichromates, and mixtures thereof, to form a clean metal surface free of any detectable surface coating which is thereafter immersed in said coating composition to form a resinous coating thereon.

8. The process of claim 7 wherein the alkaline cleaning solution comprises a solution of sodium hydroxide and sodium phosphate.

9. A coating process comprising:
   (A) contacting a clean metal surface, wherein at least a portion of said surface is worked or roughened, with an acid corrosion inhibitor selected from the group consisting of organic acid inhibitors, chromates and dichromates and mixtures thereof said inhibitor not forming a detectable coating on said surface; and thereafter,
   (B) forming on said surface an autodeposited coating by contacting said surface with an autodepositing composition comprising an acidic aqueous solution containing fluoride and ferric iron and having resin solids dispersed therein.

10. A process according to claim 9 wherein said acid corrosion inhibitor is combined with an alkaline cleaning solution and is present in an amount between about 0.1% and about 1.0% by weight of said cleaning solution.

* * * * *

UNITED STATES PATENT AND TRADEMARK OFFICE
CERTIFICATE OF CORRECTION

PATENT NO. : 4,242,379
DATED : December 30, 1980
INVENTOR(S) : Wilbur S. Hall and Harry M. Leister It is certified that error appears in the above-identified patent and that said Letters Patent are hereby corrected as shown below:

Col. 1, line 6      "30" should read --21--.

Col. 2, line 41     "have" should read --having--.

Col. 2, line 66     "defectfree" should read --defect-free--.

Col. 9, line 52     "compsitions" should read --compositions--.

Signed and Sealed this

Twenty-sixth Day of May 1981

[SEAL]

Attest:

RENE D. TEGTMEYER

Attesting Officer    Acting Commissioner of Patents and Trademarks